United States Patent
Swiderski et al.

(10) Patent No.: US 9,266,202 B2
(45) Date of Patent: Feb. 23, 2016

(54) ROTOR CENTRALIZATION FOR TURBINE ENGINE ASSEMBLY

(71) Applicant: PRATT & WHITNEY CANADA CORP., Longueuil (CA)

(72) Inventors: Joseph Swiderski, Dundas (CA); Scott Smith, St-Lambert (CA); Lawrence Marshall, St-Hubert (CA)

(73) Assignee: PRATT & WHITNEY CANADA CORP., Longueuil, Quebec (CA)

(*) Notice: Subject to any disclaimer, the term of this patent is extended or adjusted under 35 U.S.C. 154(b) by 128 days.

(21) Appl. No.: 14/247,633

(22) Filed: Apr. 8, 2014

(65) Prior Publication Data
US 2014/0237804 A1 Aug. 28, 2014

Related U.S. Application Data

(62) Division of application No. 13/036,075, filed on Feb. 28, 2011, now Pat. No. 8,726,477.

(51) Int. Cl.
*B23P 15/04* (2006.01)
*B23P 19/04* (2006.01)
*F02C 7/00* (2006.01)
*F01D 25/28* (2006.01)

(52) U.S. Cl.
CPC ............ *B23P 19/042* (2013.01); *F01D 25/285* (2013.01); *F02C 7/00* (2013.01); *F05D 2230/60* (2013.01); *F05D 2230/70* (2013.01); *Y10T 29/49234* (2015.01); *Y10T 29/49998* (2015.01); *Y10T 29/53913* (2015.01); *Y10T 29/53961* (2015.01)

(58) Field of Classification Search
CPC ........ B23P 19/04; B23P 19/022; B23P 19/00; B23K 2201/001; B23K 2201/04
See application file for complete search history.

(56) References Cited

U.S. PATENT DOCUMENTS

| | | |
|---|---|---|
| 2,073,314 A | 3/1937 | Mihalyi |
| 2,377,965 A | 6/1945 | Rataiczak |
| 3,056,369 A | 10/1962 | Roth |
| 3,286,335 A | 11/1966 | Pietra |
| 3,409,970 A | 11/1968 | Pietra |
| 4,373,980 A | 2/1983 | Skalmierski et al. |
| 4,451,979 A | 6/1984 | Schuster |
| 4,491,307 A | 1/1985 | Ellefson |
| 4,590,653 A | 5/1986 | Ades et al. |
| 4,773,864 A | 9/1988 | Holt |
| 5,513,838 A | 5/1996 | Van Rossum |
| 5,575,145 A | 11/1996 | O'Neill et al. |
| 5,666,724 A | 9/1997 | Kolsun |
| 5,822,841 A | 10/1998 | Bales et al. |
| 5,870,824 A | 2/1999 | Lilja et al. |
| 6,189,211 B1 | 2/2001 | Suter |
| 6,244,819 B1 | 6/2001 | Voorhees |
| 6,616,429 B1 | 9/2003 | Weber et al. |
| 6,725,542 B1 | 4/2004 | Maguire |
| 6,883,224 B2 | 4/2005 | Thomas |

(Continued)

*Primary Examiner* — Lee D Wilson
(74) *Attorney, Agent, or Firm* — Norton Rose Fulbright Canada LLP

(57) ABSTRACT

One or more support elements radially extend through one or more openings defined in a turbine engine casing and are configured to centralize and at least partially support a rotor assembly of the engine during an engine disassembly or assembly procedure. The support elements are configured to transfer any rotor assembly weight loads to an engine casing while a bearing support of the rotor assembly is absent or removed.

9 Claims, 3 Drawing Sheets

(56) References Cited

U.S. PATENT DOCUMENTS

| | | |
|---|---|---|
| 7,197,803 B2 | 4/2007 | Kemsley et al. |
| 7,581,722 B2 | 9/2009 | Garry et al. |
| 7,627,941 B2 | 12/2009 | Shervington et al. |
| 7,721,434 B2 | 5/2010 | Weaver et al. |
| 7,770,292 B2 | 8/2010 | Stretton |
| 2010/0218508 A1 | 9/2010 | Brown et al. |
| 2013/0074334 A1 | 3/2013 | Swiderski et al. |

ROTOR CENTRALIZATION FOR TURBINE ENGINE ASSEMBLY

CROSS REFERENCED TO RELATED APPLICATION

The present application is a divisional application of U.S. patent application Ser. No. 13/036,075 filed on Feb. 28, 2011, the entire content of which is herein incorporated by reference.

TECHNICAL FIELD

The described subject matter relates generally to gas turbine engines and more particularly, to rotor centralization in gas turbine engine assembly.

BACKGROUND OF THE ART

A gas turbine engine generally includes one or more rotors supported by bearing structures in the engine. During an engine maintenance operation, such as on-wing hot section inspections of an aircraft turbine engine, in some engines an aft engine portion including an aft shaft bearing support structure is removed to provide access to the interior of the engine. Once the bearing support is removed, however, the rotor which the bearing supports tends to droop down, under its own weight, at the unsupported side to thereby create misalignment relative to the remaining support structures within the engine. This misalignment may cause damage to the rotor components at tight fit locations and may also cause difficulties during re-assembly of the engine.

Accordingly, there is a need to provide an improved approach.

SUMMARY

In accordance with one aspect, the described subject matter provides a method for supporting a gas turbine rotor assembly during engine assembly/disassembly, the rotor assembly having a central shaft extending substantially horizontally and supported by at least one bearing support structure, the method comprising: a) extending at least one elongate support element radially through an opening defined in a casing of the engine, the casing surrounding the rotor assembly; b) contacting the at least one support element with a portion of the rotor assembly at a location spaced apart from the at least one bearing support structure; and c) rigidly connecting the at least one support element to the casing of the engine, wherein the at least one support element is configured and positioned such that the at least one support element and the at least one bearing support structure cooperate to centralize and at least partially support the weight of the rotor assembly when a second bearing support structure of the engine is absent.

In accordance with another aspect, the described subject matter provides an apparatus for supporting a rotor assembly in a substantially centered position in a gas turbine engine, the apparatus comprising: at least three elongate support elements each extending radially through an opening defined in an exterior of a casing surrounding the rotor assembly, an inner end of each support element contacting with a periphery of the rotor assembly, the support elements each being connected at an outer end thereof to said exterior of the casing, the at least three support elements thereby configured to centralize and support the rotor assembly when a bearing support structure of the rotor assembly is absent.

In accordance with a further aspect, the described subject matter provides a method for supporting first and second rotor assemblies during engine assembly/disassembly, the second rotor assembly having a hollow central second shaft extending substantially horizontally and supported by at least at one bearing support structure, a first central shaft of the first rotor assembly co-axially extending through the hollow central second shaft of the second rotor assembly, opposite front and aft end portions of each of the first and second shafts being supported by a respective front support structure and an aft support structure within the engine during engine operation, the method comprising: a) radially extending three rigid elongate support elements through respective openings circumferentially spaced apart in a casing surrounding the first and second rotor assemblies, to lock the second rotor assembly in a substantially horizontal and centered position in the engine; and b) inserting at least one spacer in an annulus between the first and second shafts to support the first rotor assembly on the second rotor assembly, thereby locking the first and second shafts in the coaxial relationship.

Further details of these and other aspects of the described subject matter will be apparent from the detailed description and drawings included below.

DESCRIPTION OF THE DRAWINGS

Reference is now made to the accompanying drawings depicting aspects of the present invention, in which.

DETAILED DESCRIPTION

Figure 1:
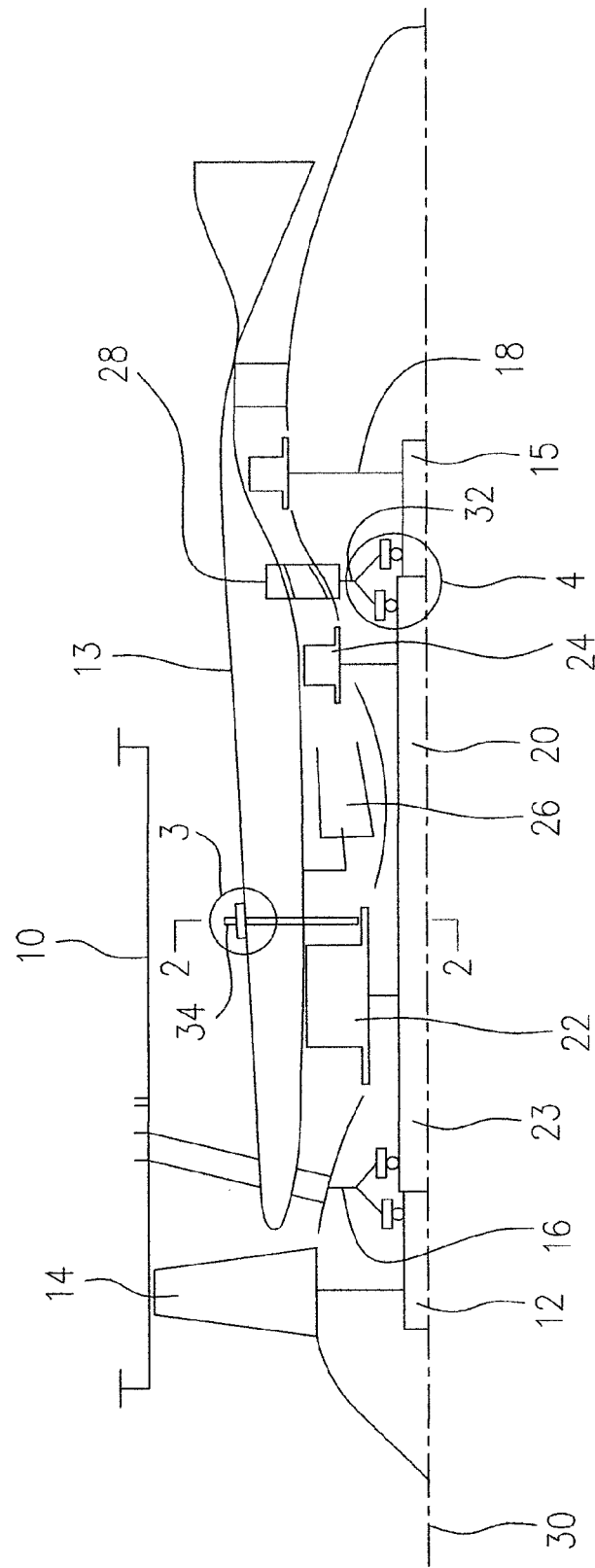
FIG. 1 is a schematic cross-sectional view of a turbofan gas turbine engine according to one embodiment of the present description.
Figure 4:
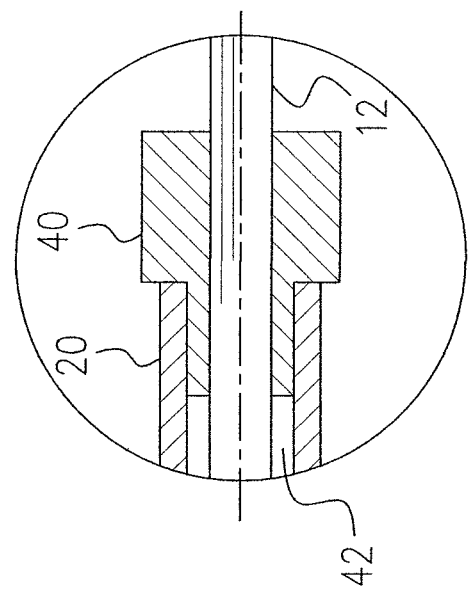
FIG. 4 illustrates an enlarged area of the engine, as circled and indicated by numeral 4 in FIG. 1, showing a spacer placed between the coaxial high and low pressure spool shafts when a bearing structure is removed, according to another embodiment.
Figure 3:
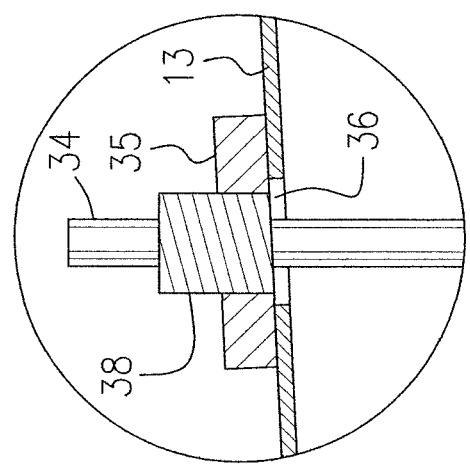
FIG. 3 illustrates an enlarged area of the engine, as circled and indicated by numeral 3 in FIG. 1, showing the adjustable connection of the bolt to the casing.

FIG. 4 illustrates an enlarged area of the engine, as circled and indicated by numeral 4 in FIG. 1, showing a spacer placed between the coaxial high and low pressure spool shafts when a bearing structure is removed, according to another embodiment.

Referring to FIG. 1, a turbofan gas turbine engine which is taken as an exemplary application of the described subject matter, includes a fan case or engine nacelle 10, a core casing 13, a low pressure spool assembly 15 which includes a fan assembly 14 and a low pressure turbine assembly 18 connected by a central shaft 12, and a high pressure spool assembly 23 which includes a high pressure compressor assembly 22 and a high pressure turbine assembly 24 connected by a central shaft 20. The core casing 13 surrounds the low and high pressure spool assemblies 15, 23 defining a main fluid path (gas path) therethrough (not numbered). In the main fluid path there is provided a combustor 26 to generate combustion gases in order to power the high and low pressure turbine assemblies 24, 18.

The shaft 20 of the high pressure spool assembly 23 is hollow to allow the shaft 12 of the low pressure spool assembly 15 to extend therethrough such that the shafts 12 and 20 and thus the low pressure and high pressure spool assemblies are disposed substantially coaxially within the engine. The common rotation axis of the shafts 12 and 20 defines the main central axis 30 of the engine.

A bearing support structure 16 which may be part of an intermediate case (not indicated) of the engine, supports the respective shafts 12 and 20 at a front or upstream portion thereof and a bearing support structure 32 which may be part of a mid turbine frame 28 positioned between the high pressure turbine assembly 24 and the low pressure turbine assembly 18, supports the respective shafts 20, 12 at an aft or downstream portion thereof. Therefore, the bearing support structures 16 and 32 assure the centered position of both shafts 12 and 20, and thus the low and high pressure spool assemblies within the engine.

Referring to FIGS. 1-4, one embodiment is shown for a method and apparatus for temporarily supporting or locking a gas turbine rotor assembly such that the respective shafts 12 and 20 are in their substantially centered positions within the engine during engine assembly/disassembly when the engine is disposed substantially horizontally and one of the bearing support structures 16, 32 is absent. During an engine maintenance operation such as in a hot section inspection, an aft portion of the engine including the mid turbine frame 28 is removed to provide rear end access to the interior of the engine. The shafts 12 and 20, particularly the aft portion thereof, tends to drop down, causing deviation from the main central axis 30 of the engine, which is not desirable and should be avoided. Therefore, an apparatus for temporarily supporting or locking the shafts 12 and 20 in their substantially centered position within the engine is desired.

The apparatus according to this embodiment includes three rigid elongate support elements such as metal bolts 34 which radially extend through respective openings 36 circumferentially spaced apart in the core casing 13, to lock the high pressure spool assembly 23 in a substantially horizontal and centered position in the engine. At this moment, the substantially horizontal and centered position of the shafts 12, 20 and thus the low and high pressure spool assemblies 15, 23 are assured by the bearing support structures 16 and 32. Each of the bolts 34 is releasably secured to an outside of the core casing 13. For example, a nut 35 is welded to the outside of the core casing 13, aligning with each of the openings 36 for engagement with a threaded section 38 of each bolt 34.

Figure 2:
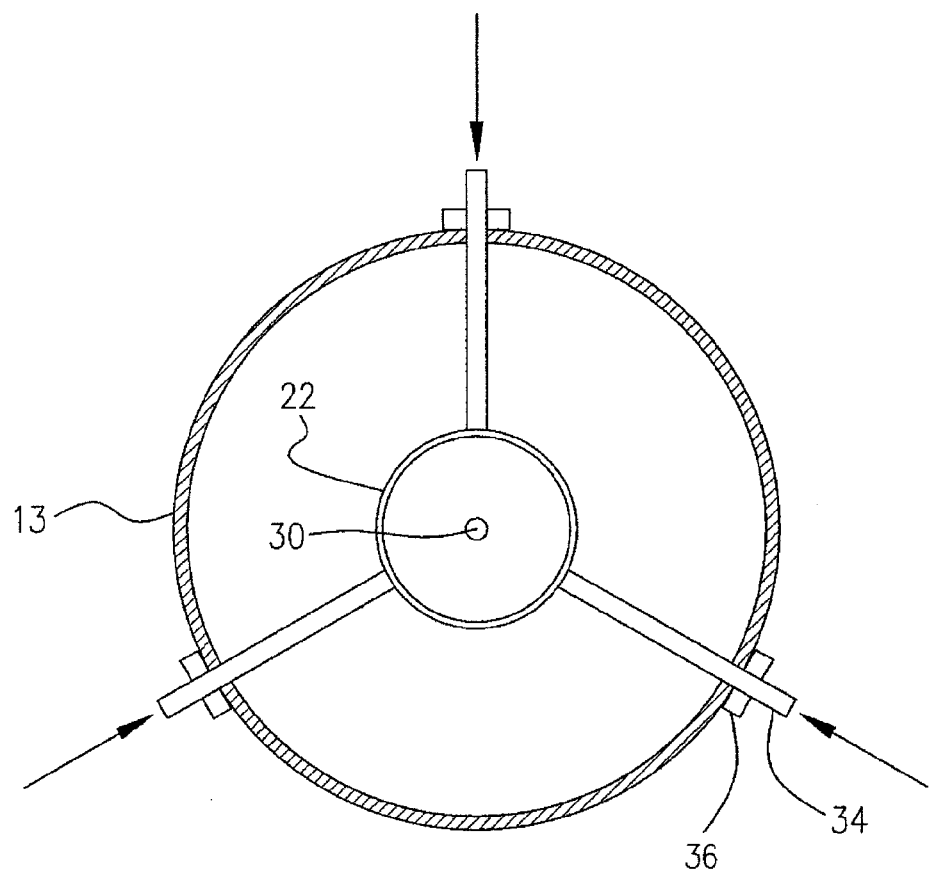
FIG. 2 is a simplified schematic transverse cross-section of the turbofan gas turbine engine taken along line 2-2 of FIG. 1.

The threading engagement of the threaded section 38 of the bolt 34 with the nut 35 also functions as a means for adjusting the radial position of each bolt 34 relative to the core casing 13 in order to ensure a firm contact between an inner end of the bolt 34 and the high pressure spool assembly 23 which is represented by the high pressure compressor assembly 22 in FIG. 2. The threaded section 38 located in an outer end portion of each bolt 34, may have a diametric dimension larger than the diameter of the remaining section of the bolt in order to allow the bolt 34 to conveniently extend through the opening 36 in the core casing 13.

The three bolts 34 may be disposed in a same axial location of the engine and may in combination define a plane as shown in FIG. 2, substantially perpendicular to the central axis 30 of the engine. Alternatively, the three bolts 34 may be disposed in different axial locations of the engine. The axial location of the bolts 34 may be selected differently for different types of engines. For example, in the embodiment shown in FIG. 1, the bolts 34 are positioned in an axial location such that the inner ends of the bolts 34 are in contact with the high pressure compressor assembly 22, such as in contact with a compressor platform (not numbered) thereof The compressor platforms in combination define an inner surface of the main fluid path of the rotor assembly.

The one or more openings 36 in the core casing 13 which receive the respective bolts 34 to radially extend therethrough, may be existing ports defined in the core casing 13 such as a borescope port, if one or more such existing ports are available at a desirable axial location(s) of core casing 13. Otherwise, openings 36 dedicated for temporarily receiving the respective bolts 34 are provided in the selected locations of the core casing 13 and are sealingly covered during engine operation.

The axial location of the bolts 34 should also be convenient for access from the outside of the core casing 13 to place and remove the bolts 34. In the embodiment illustrated in FIG. 1, an aft section of the engine nacelle 10 is either openable or removable from the remaining section of the nacelle 10 which is mounted to the wing of an aircraft.

It should be noted that one of the bolts 34 as shown in FIG. 2, is disposed substantially in a vertical direction, which may not be necessary. However, if one of the bolts 34 is vertically disposed under the high pressure compressor assembly 22 as in an inverted image of FIG. 2, the bolt 34 in combination with the bearing support structure 16 will fully support the shaft 20 and thus the high pressure spool assembly 23 in its substantially horizontal and centered position within the engine when the bearing support structure 32 is removed. Therefore, the other two bolts 34 may not be in use. This single bolt support arrangement may be desirable in some circumstances according to various engine structures and/or tasks.

A spacer, for example a sleeve 40 according to this embodiment, may be provided to be inserted in an annulus 42 between the coaxial shafts 20 and 12 to support the inner shaft 12 on the outer shaft 20 in their coaxial relationship, thereby maintaining the low pressure spool assembly 15 in the substantially horizontal and centered position within the engine when the bearing support structure 32 is removed. The spacer 40 may have a small section (not numbered) having a thickness to allow easy insertion of the small section into the annulus 42 while substantially maintaining the coaxial relationship between the shafts 12 and 20. The sleeve 40 may further include a large section (not numbered) having a diametric dimension larger than the diameter of the hole of the shaft 20, to prevent over-insertion of the sleeve 40 from the aft end portion of the shaft 20 and to facilitate easy removal of the sleeve 40.

It should be noted that placement of the bolts 34 and the sleeve 40 for temporarily locking the substantially horizontal and centered position of the respective shafts 20 and 12 within the engine during an engine maintenance operation, should be completed before removing the bearing support structure 32 and the bolts 34 and the sleeve 40 should be maintained in position until the maintenance operation is completed and the bearing support structure 32 is placed back in position.

In circumstances wherein the bearing support structure 16 which is located at the front portion of the high and low pressure spool assemblies 23, 16 is to be removed, the sleeve 40 should be placed in the annulus 42 between the inner and outer shafts 12, 20 at a front end portion of the shafts 12, 20. If use of a sleeve 40 is not applicable due to engine structure, individual spacers such as three spacer blocks (not shown) instead of the sleeve 40 may be used.

The method and apparatus described above for temporarily locking and/or supporting the rotors of a gas turbine engine in their substantially centered position within the engine are not limited to use in an engine maintenance operation. The described method and apparatus may also be used for engine production assembly. The described method and apparatus may allow an engine assembly procedure in a more "ergonomic friendly position" with regard to assembly steps conducted and assembly platforms used in a horizontal engine assembly procedure with respect to those in an vertical engine assembly procedure.

The above description is meant to be exemplary only, and one skilled in the art will recognize that changes may be made to the embodiments described without departure from the scope of the described subject matter. For example, although a turbofan gas turbine engine having coaxially positioned high and low pressure spool assemblies has been used as an exemplary application of the described method and apparatus, the method and apparatus may be applicable to various types of gas turbine engines. The bearing support structures may not necessarily be associated with a mid turbine frame or an intermediate case but could be applied to any support structures depending on the particular engine structure for which the described method and apparatus are used. The use of elongate support elements such as the metal bolts and the use of spacers such as the sleeves, may not necessarily be combined and can be applicable one without the other depending on the particular engine structure in which they are used. Although a horizontal arrangement is discussed, the approach may likewise be applied to a gas turbine engine vertically-oriented during assembly or maintenance. Still other modifications which fall within the scope of the described subject matter will be apparent to those skilled in the art, in light of a review of this disclosure, and such modifications are intended to fall within the appended claims.

The invention claimed is:

1. A method for supporting a gas turbine rotor assembly during engine assembly/disassembly, the rotor assembly having a central shaft extending substantially horizontally and supported by at least one bearing support structure, the method comprising:
   a) extending at least one elongate support element radially through an opening defined in a casing of the engine, the casing surrounding the rotor assembly;
   b) contacting the at least one support element with a portion of the rotor assembly at a location spaced apart from the at least one bearing support structure; and
   c) rigidly connecting the at least one support element to the casing of the engine, wherein the at least one support element is configured and positioned such that the at least one support element and the at least one bearing support structure cooperate to centralize and at least partially support the weight of the rotor assembly when a second bearing support structure of the engine is absent.

2. The method as defined in claim 1 wherein the at least one support element comprises three support elements, the three support elements being equidistantly spaced about the rotor assembly to thereby cooperatively fix the rotor assembly in the substantially centered and horizontal position within the engine.

3. The method as defined in claim 1 wherein an inner end of the at least one support element contacts the rotor assembly.

4. The method as defined in claim 1 wherein the at least one support element contacts an annular inner gas path surface of the rotor assembly.

5. The method as defined in claim 2 further comprising a step of adjusting a radial effective length of each of the support elements relative to the casing before connecting the respective support elements to the casing.

6. The method as defined in claim 1, wherein the at least one support element is connected to an outer side of the casing.

7. The method as defined in claim 1, wherein an outer end of the at least one support element is connected to the casing.

8. The method as defined in claim 2 further comprising the step of adjusting said second bearing support structure so that it does not support the rotor assembly.

9. The method as defined in claim 2 further comprising installing said second bearing support structure within the engine to support the rotor assembly during an engine assembly procedure, and then removing said support elements from said rotor assembly contact.

* * * * *